United States Patent
Marum

(10) Patent No.: US 9,578,167 B2
(45) Date of Patent: *Feb. 21, 2017

(54) CUSTOMER RELATIONSHIP MANAGEMENT (CRM) AUDIO ON HOLD

(71) Applicant: SugarCRM Inc., Cupertino, CA (US)

(72) Inventor: Matthew Marum, Cary, NC (US)

(73) Assignee: SugarCRM, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/076,574

(22) Filed: Mar. 21, 2016

(65) Prior Publication Data

US 2016/0205243 A1 Jul. 14, 2016

Related U.S. Application Data

(63) Continuation of application No. 14/060,709, filed on Oct. 23, 2013, now Pat. No. 9,294,619.

(51) Int. Cl.
| | |
|---|---|
| H04M 3/428 | (2006.01) |
| G10L 13/04 | (2013.01) |
| H04M 1/64 | (2006.01) |
| H04M 3/51 | (2006.01) |

(52) U.S. Cl.
CPC ......... *H04M 3/4285* (2013.01); *G10L 13/043* (2013.01); *H04M 1/645* (2013.01); *H04M 3/5183* (2013.01); *H04M 2201/39* (2013.01); *H04M 2203/306* (2013.01)

(58) Field of Classification Search
CPC .................................... H04M 2201/39
USPC ............... 379/162, 163, 201.01, 207.02, 393
See application file for complete search history.

(56) References Cited

U.S. PATENT DOCUMENTS

| | | | |
|---|---|---|---|
| 9,294,619 B2 * | 3/2016 | Marum | H04M 3/4285 |
| 2007/0004384 A1 * | 1/2007 | Anupam | H04M 3/4285 455/414.1 |
| 2015/0110260 A1 * | 4/2015 | Marum | H04M 3/4285 379/207.02 |

* cited by examiner

*Primary Examiner* — Harry S Hong
(74) *Attorney, Agent, or Firm* — Steven M. Greemberg. Esq.; CRGO Law

(57) ABSTRACT

Embodiments of the present invention provide a method, system and computer program product for CRM audio on hold. In an embodiment of the invention, a CRM audio on hold method includes identifying a caller associated with the telephone call received in a call processing gateway, selecting a record in a CRM application pertinent to the caller and inserting the selected record into a variable field of a template. The method also includes text-to-speech (TTS) processing the template into audio and returning the audio to the call processing gateway for playback to the caller while the caller is on hold.

12 Claims, 2 Drawing Sheets

CUSTOMER RELATIONSHIP MANAGEMENT (CRM) AUDIO ON HOLD

This application is a Continuation Application of U.S. application Ser. No. 14/060,709, filed on Oct. 23, 2013, entitled "CUSTOMER RELATIONSHIP MANAGEMENT (CRM) AUDIO ON HOLD", the entire text of which is specifically incorporated by reference herein.

BACKGROUND OF THE INVENTION

Field of the Invention

The present invention relates to CRM call processing and more particularly to caller on hold management in a CRM application.

Description of the Related Art

In business, beyond the sale of a product or service remains the fundamental management of the relationship between the vendor and the customer. CRM applications seek to provide a foundation upon which business can manage the relationship with the customer from the moment in time before one becomes a customer to the moment in beyond which one becomes a customer. Modern CRM applications provide this foundation through a collection of well organized database records relating to all aspects of the customers and the products and services provided by the vendor to the customers. A visual user interface presents a view to the database records so as to assist the business in visualizing the past, present and potentially future state of the relationship between the business and the customer.

CRM applications often are equipped to manage communications with customers. In the twenty-first century, a common mode of interacting with customers and even potential customers is electronic mail followed closely by instant messaging. However, the venerable telephone call remains part and parcel of the business-to-customer relationship. With respect to telephone call processing in CRM, at the outset, what is required is the receipt of a telephone call from the customer to the vendor—typically a call center of the vendor. As it is well-understood, however, in many instances, more telephone calls are received in the call center than there are available persons to process the call. Alternatively, oftentimes, a caller is compelled to wait while a call center operator processes a request of the caller. In either instance, the caller is placed on hold.

Traditionally, when a caller is placed on hold, music is played over the telephone call so as to entertain the caller, and also to provide a mental cue that the telephone call has not been dropped. Alternatively, generic messaging is presented over the call, reminiscent of a paid television programming or an "infomercial". Of course, long hold periods for a caller can be frustrating—especially when the caller seeks assistance with a purchased product or service, or where the caller is impatient in seeking information regarding a potential purchase of a product or service. The generically provided music for a caller on hold seldom acts to alleviate the impatience experienced by the caller on hold. Further, corporate propaganda pertaining to generic infomercial material certainly does not act to sooth the caller on hold.

BRIEF SUMMARY OF THE INVENTION

Embodiments of the present invention address deficiencies of the art in respect to caller on hold processing and provide a novel and non-obvious method, system and computer program product for CRM audio on hold. In an embodiment of the invention, a CRM audio on hold method includes identifying a caller associated with the telephone call received in a call processing gateway, selecting a record in a CRM application pertinent to the caller and inserting the selected record into a variable field of a template. The method also includes text-to-speech (TTS) processing the template into audio and returning the audio to the call processing gateway for playback to the caller while the caller is on hold.

In another embodiment of the invention, a CRM data processing system can be configured for CRM audio on hold. The system can include a host computing system that includes at least one computer with memory and at least one processor and a database coupled to the host computing system. The system also includes a CRM application executing in the memory of the host computing system and a call processing gateway processing telephone calls from callers over a public switched telephone network (PSTN). Finally, the system includes a CRM audio on hold module coupled to both the CRM application and the call processing module. The CRM audio on hold module includes program code enabled to identify a caller associated with a telephone call received in the call processing gateway, to select a record in a CRM application pertinent to the caller, to insert the selected record into a variable field of a template, to text-to-speech (TTS) process the template into audio and to return the audio to the call processing gateway for playback to the caller while the caller is on hold.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for CRM audio on hold. In an embodiment of the invention, a call can be received into a call processing portion of a CRM system. A caller associated with the call can be determined by lookup of CRM contact records. Thereafter, responsive to the placement of the call on hold, a selection of records specific to the caller can be retrieved into memory and text-to-speech processed into audio corresponding to the selection of records. The audio corresponding to the selection of records can be complimented with generic audio of a template and providing context for the selected records. Thereafter, the audio in turn can be presented to the caller while the caller remains on hold. In this way, while the caller remains on hold, the caller on hold at least can receive information pertinent to the caller, such as a list of open cases in the CRM application and a status of those open cases.

Figure 1:
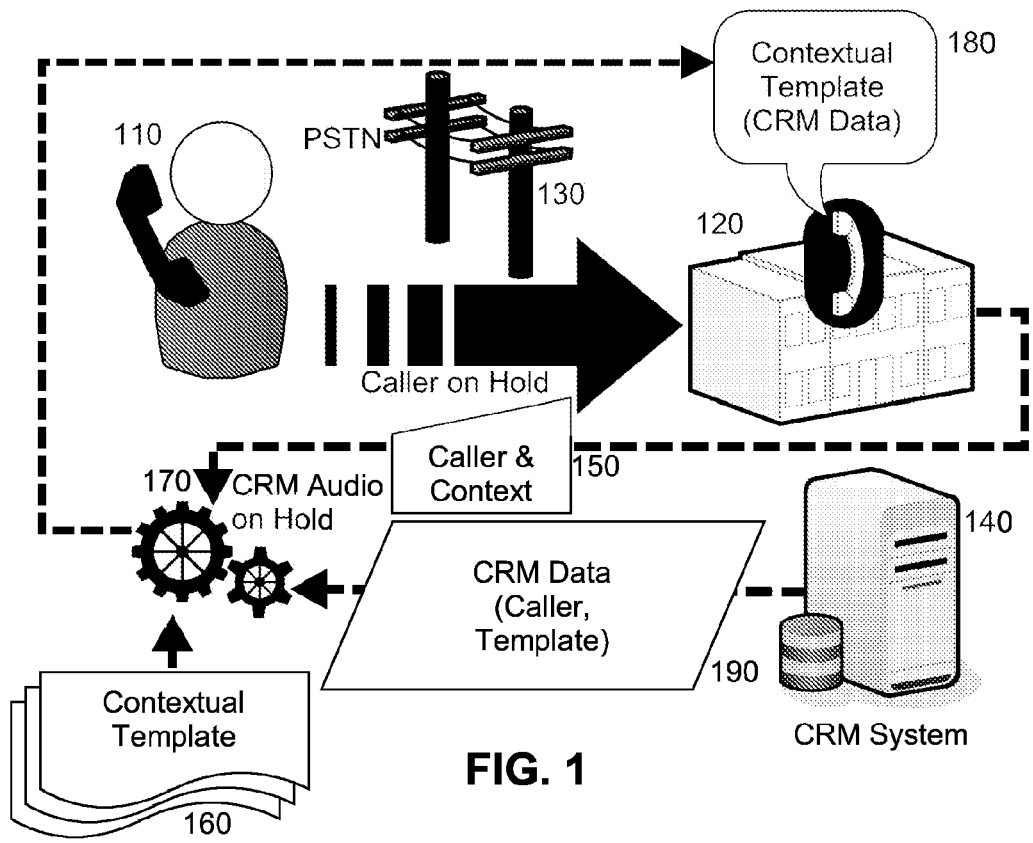
FIG. 1 is a pictorial illustration of a process for CRM audio on hold.

In further illustration, FIG. 1 pictorially shows a process for CRM audio on hold. As shown in FIG. 1, a call can be established as between a caller 110 and a call processing gateway 120 over a PSTN 130. The call processing gateway 120 can place the caller 110 on hold and the call processing gateway 120 can provide to CRM audio on hold logic 170 call data 150. The call data 150 can include the identity of the caller 110 and a context of the call. The context of the call can include, by way of example, an expected duration of time during which the caller 110 will remain on hold, a status of one or more records related to the caller 110, a preference of the caller 110 to receive particular information while on hold, a job title or department associated with the caller 110, whether the call originates from a home phone number or business phone number of the caller 110, and the time of day or the date of the call, including whether or not the call has occurred during or after business hours.

Using the call data 150, the CRM audio on hold logic 170 can select a contextual template 160. The contextual template 160 can include a textual script with variable fields reserved for data specific to different individuals. For instance, the textual script can relate to a status of an open trouble ticket or customer issue record of the caller 110, the textual script can relate to current announcements of products associated with the type of job or department of the caller 110, or the textual script can relate to a knowledgebase article of one or more products associated with the caller 110, to name only three possibilities. Utilizing CRM data 190 retrieved from a CRM system 140, the CRM audio on hold logic 170 can replace the variable fields of the selected one of the contextual templates 160 with the CRM data 190 to produce a completed one of the templates 190. Thereafter, the completed one of the templates 190 can be TTS processed and returned to the call processing gateway 120 as speech audio 180. The speech audio 180 in turn can be played back to the caller 110 while the caller 110 remains on hold.

Figure 2:
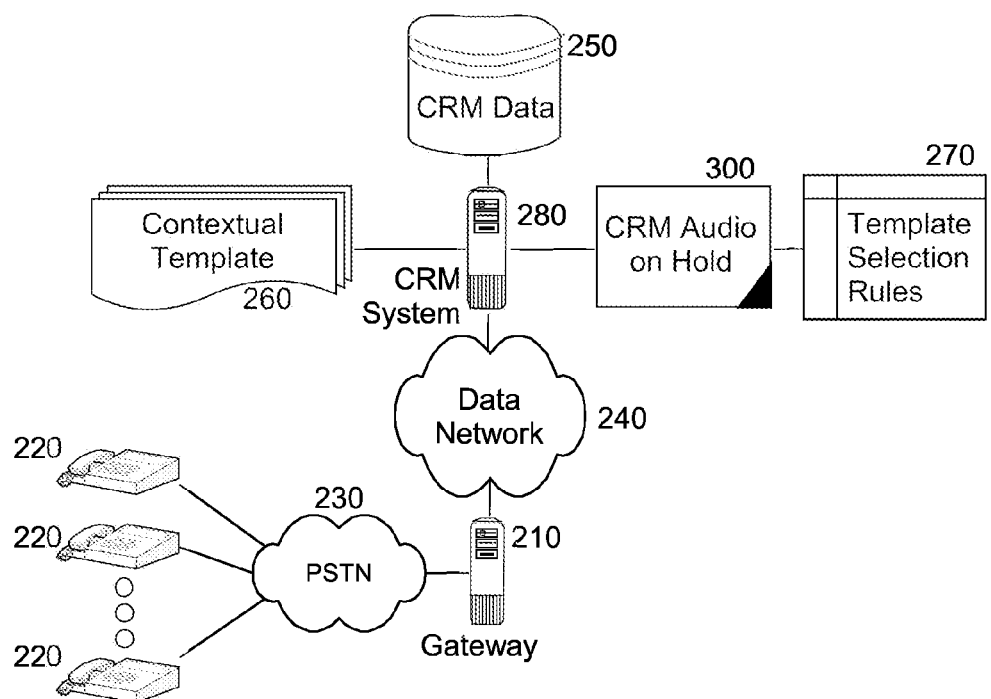
FIG. 2 is a schematic illustration of a CRM data processing system configured for CRM audio on hold; and, FIG. 3 is a flow chart illustrating a process for CRM audio on hold.

The process described in connection with FIG. 1 can be implemented in a CRM data processing system. In yet further illustration, FIG. 2 schematically shows a CRM data processing system configured for CRM audio on hold. The system can include a call processing gateway 210 configured for telecommunicative linkage to different telephone endpoint devices 220 over a PSTN 230. The call processing gateway 210 further can be configured for data communicative coupling to a CRM system 280 over a data communications network 240.

The CRM system 280 can include one or more computers, each with memory and at least one processor, and collectively supporting the execution of a CRM application (not shown) configured to provide access to CRM data 250. The CRM system 280 can be coupled to a CRM audio on hold module 300 and can include program code enabled upon execution in the memory of a computer to respond to the receipt of call data from the call processing gateway 210 to select one or more contextual templates 260 based upon one or more template selection rules 270.

The contextual templates 260 each can include generic text and one or more variable fields into which corresponding records from the CRM data 250 are to be inserted. The rules 270 in turn can include, by way of example, rules that accept as input a context of a call including an identity of a caller, a nature of an expected hold time for the caller, or both. The rules 270 further can specify based upon the context one or more templates 260 to be selected for use by the CRM audio on hold module 300 in producing speech audio for playback to a caller on hold. For example, with respect to an expected hold time for a caller on hold that is short in duration, a template of limited content can be selected, whereas with respect to an expected hold time for a caller on hold that is long in duration, a template of extensive content can be selected.

Once one or more of the contextual templates 260 has been selected by the program code of the CRM audio on hold module 300 based upon the application of one or more of the rules 270, the program code of the CRM audio on hold module 300 can be enabled to retrieve one or more records from the CRM data 250 for an identified caller on hold in order to complete the selected one of the contextual templates 260. Subsequently, the program code of the CRM audio on hold module 300 can direct the TTS processing of the complete one or more of the templates 260 in order to produce speech audio. Finally, the program code of the CRM audio on hold module 300 can be enabled to return the speech audio to the call processing gateway 210 for playback to the caller on hold.

Figure 3:
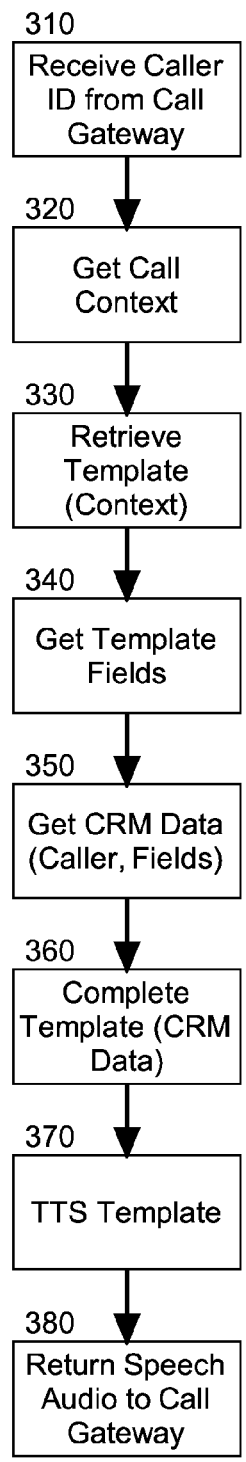

In even yet further illustration of the operation of the CRM audio on hold module 300, FIG. 3 is a flow chart illustrating a process for CRM audio on hold. Beginning in block 310, a caller identity of a call can be received from a call processing gateway for a caller on hold. In block 320, a context for the call can be receied and in block 330, a template can be selected based upon the context. In block 340, one or more variable fields can be identified and in block 350, CRM data for the identified caller can be retrieved for inclusion in the selected template according to the variable fields in block 360.

In block 370, the template with CRM data for the identified caller placed in the variable fields can be TTS processed to produce speech audio. Optionally, the TTS processing can occur in a remote TTS service receiving the completed template from over a data communications network and returning the speech audio over the data communications network. Finally, in block 380 the speech audio can be provided to the call processing gateway for playback to the caller on hold.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A customer relationship management (CRM) audio on hold method comprising:

identifying in memory of a computer a caller associated with the telephone call received in a call processing gateway;

selecting by a processor of the computer a record in a CRM application pertinent to the caller;

inserting by the processor of the computer the selected record into a variable field of a template selected according to a context of the call and text-to-speech (TTS) processing the template by the processor of the computer into audio; and, returning the audio from the memory of the computer to the call processing gateway for playback to the caller while the caller is on hold.

2. The method of claim 1, wherein the selected record is a case stored in the CRM application for the caller.

3. The method of claim 1, wherein the selected record is a status of a case stored in the CRM application for the caller.

4. The method of claim 1, wherein the template is TTS processed by a remote service.

5. A customer relationship management (CRM) data processing system configured for CRM audio on hold, the system comprising:

a host computing system comprising at least one computer with memory and at least one processor;

a database coupled to the host computing system;

a CRM application executing in the memory of the host computing system;

a call processing gateway processing telephone calls from callers over a public switched telephone network (PSTN); and, a CRM audio on hold module coupled to both the CRM application and the call processing module, the CRM audio on hold module comprising program code enabled to identify a caller associated with a telephone call received in the call processing gateway, to select a record in a CRM application pertinent to the caller, to insert the selected record into a variable field of a template selected according to a context of the call, to text-to-speech (TTS) process the template into audio and to return the audio to the call processing gateway for playback to the caller while the caller is on hold.

6. The system of claim 5, wherein the selected record is a case stored in the CRM application for the caller.

7. The system of claim 5, wherein the selected record is a status of a case stored in the CRM application for the caller.

8. The system of claim 5, wherein the template is TTS processed by a remote service.

9. A computer program product for customer relationship management (CRM) audio on hold, the computer program product comprising:

a computer readable storage memory device having computer readable program code embodied therewith, the computer readable program code comprising:

computer readable program code for identifying a caller associated with the telephone call received in a call processing gateway;

computer readable program code for selecting a record in a CRM application pertinent to the caller;

computer readable program code for inserting the selected record into a variable field of a template selected according to a context of the call and text-to-speech (TTS) processing the template into audio; and, computer readable program code for returning the audio to the call processing gateway for playback to the caller while the caller is on hold.

10. The computer program product of claim 9, wherein the selected record is a case stored in the CRM application for the caller.

11. The computer program product of claim 9, wherein the selected record is a status of a case stored in the CRM application for the caller.

12. The computer program product of claim 9, wherein the template is TTS processed by a remote service.

* * * * *